United States Patent
Sakurai et al.

(10) Patent No.: US 9,000,726 B2
(45) Date of Patent: Apr. 7, 2015

(54) CELL BALANCE DEVICE AND BATTERY SYSTEM

(75) Inventors: Atsushi Sakurai, Chiba (JP); Hiroshi Saito, Chiba (JP)

(73) Assignee: Seiko Instruments Inc., Chiba (JP)

( * ) Notice: Subject to any disclaimer, the term of this patent is extended or adjusted under 35 U.S.C. 154(b) by 405 days.

(21) Appl. No.: 13/571,572

(22) Filed: Aug. 10, 2012

(65) Prior Publication Data

US 2013/0049691 A1    Feb. 28, 2013

(30) Foreign Application Priority Data

Aug. 22, 2011   (JP) ................................ 2011-180446

(51) Int. Cl.
   *H02J 7/00*   (2006.01)
(52) U.S. Cl.
   CPC ............. *H02J 7/0019* (2013.01); *H02J 7/0016* (2013.01); *H02J 7/0026* (2013.01); *H02J 2007/0039* (2013.01)
(58) Field of Classification Search
   CPC ..... H02J 7/0016; H02J 7/0026; H02J 7/0031; H02J 2007/0039; H01M 10/482; H01M 2010/4271; H01M 10/48; H01M 10/46
   USPC ........................................................ 320/118
   See application file for complete search history.

(56) References Cited

U.S. PATENT DOCUMENTS

| | | | |
|---|---|---|---|
| 5,821,729 A * | 10/1998 | Schmidt et al. | ................ 320/126 |
| 6,459,236 B2 | 10/2002 | Kawashima | |
| 6,479,975 B1 | 11/2002 | Plankensteiner et al. | |
| 7,015,745 B1 | 3/2006 | Burinskiy et al. | |
| 8,384,343 B2 * | 2/2013 | Kojori et al. | ................... 320/104 |
| 2011/0163728 A1 | 7/2011 | Sutardja et al. | |

FOREIGN PATENT DOCUMENTS

EP    2 352 218 A2    8/2011

OTHER PUBLICATIONS

European Search Report in corresponding European Application No. 12 18 0203, dated Aug. 7, 2014, 2 pages.

* cited by examiner

*Primary Examiner* — Jack Chiang
*Assistant Examiner* — Brandon Bowers
(74) *Attorney, Agent, or Firm* — Brinks Gilson & Lione

(57) ABSTRACT

Provided are a cell balance device for protecting a switch circuit from an overcurrent flow. The cell balance device includes: a plurality of electric accumulator connection terminals each connected to one of a node and two terminals of electric accumulators connected in series; a voltage hold device connection terminal connected to a voltage hold device; a plurality of first switch circuits provided between the plurality of electric accumulator connection terminals and the voltage hold device; a control circuit for controlling ON/OFF of the plurality of first switch circuits based on a synchronization signal; and an overcurrent detection circuit for detecting an overcurrent flowing through each of the plurality of first switch circuits.

4 Claims, 4 Drawing Sheets

CELL BALANCE DEVICE AND BATTERY SYSTEM

RELATED APPLICATIONS

This application claims priority under 35 U.S.C. §119 to Japanese Patent Application No. 2011-180446 filed on Aug. 22, 2011, the entire content of which is hereby incorporated by reference.

BACKGROUND OF THE INVENTION

1. Field of the Invention

The present invention relates to a cell balance device for achieving a cell balance of secondary batteries connected in series and to a battery system including the cell balance devices, and more particularly, to a cell balance device capable of preventing a switch circuit of the cell balance device from being broken down by an overcurrent and to a battery system including the cell balance devices.

2. Description of the Related Art

FIG. 5 illustrates a circuit diagram of a conventional cell balance adjusting circuit. A cell balance device including the conventional cell balance adjusting circuit is provided with a battery pack portion, in which a plurality of secondary battery cells (hereinafter, referred to as cells) 401 to 406 as basic components are connected in series, and switches 411 to 462 each having one contact connected to a node between the cells. The other contact of each of the switches 411, 421, 431, 441, 451, and 461 is connected to one electrode of a capacitor 407 which is a voltage hold device. The other contact of each of the switches 412, 422, 432, 442, 452, and 462 than the one contact on the cell side is connected to the other electrode of the voltage hold device 407. A load circuit or a charging circuit 408 is connected across the battery pack.

Open/close signals for the respective switches are connected so that the switch 411 and the switch 412 may operate simultaneously. Signals are similarly connected so that the switch 421 and the switch 422, the switch 431 and the switch 432, the switch 441 and the switch 442, the switch 451 and the switch 452, and the switch 461 and the switch 462 may be open/closed simultaneously each as a switch of a set of corresponding two switches.

Further, the switch open/close signals sequentially turn ON/OFF the switches 411 to 451 and the switches 412 to 462. Then, after finishing turning ON/OFF the switch 461 and the switch 462, repetitive switch open/close operations are continuously performed by returning to the first ON/OFF operation of the switch 411 and the switch 412.

Next, an operation of the conventional cell balance adjusting circuit is described. The conventional cell balance adjusting circuit scans switches sequentially in one direction so that the switches are switched over while forming parallel connections between the series-connected adjacent cells and the voltage hold device 407.

The switches 411 and 412 are configured to receive signals for simultaneous open/close operation, and the switch 421 and the switch 422 are also configured to be open/closed simultaneously. The same is applied to the other switches, and the simultaneous open/close operation is performed in each combination of the switch 431 and the switch 432, the switch 441 and the switch 442, the switch 451 and the switch 452, and the switch 461 and the switch 462.

The switches are controlled in this way, to thereby form parallel connections sequentially between all the series-connected cells and the voltage hold device 407. After completion of the formation of parallel connections to all control target cells in the battery pack, the same switching operation is repeatedly performed from the first cell, thereby adjusting a cell balance.

In the conventional technology, however, when an overcurrent flows through the switch, the switch is broken down, and hence there is a problem in that the reliability of the cell balance device is lowered.

SUMMARY OF THE INVENTION

The present invention has been devised in view of the above-mentioned problem, and provides a cell balance device capable of protecting a switch when an overcurrent flows through the switch so as to prevent the switch from being broken down, and a battery system including the cell balance devices.

In order to solve the conventional problem, the cell balance device according to the present invention is configured as follows.

There is provided a cell balance device for a battery system for adjusting a cell balance of a plurality of electric accumulators connected in series, the cell balance device including: a plurality of electric accumulator connection terminals to be each connected to one of a node and two terminals of the plurality of electric accumulators connected in series; a voltage hold device connection terminal to be connected to a voltage hold device; a plurality of first switch circuits provided between the plurality of electric accumulator connection terminals and the voltage hold device; a receiving terminal for receiving a synchronization signal; a transmitting terminal for transmitting the synchronization signal; a control circuit for controlling ON/OFF of the plurality of first switch circuits based on the synchronization signal; and an overcurrent detection circuit for detecting an overcurrent flowing through each of the plurality of first switch circuits.

There is also provided a battery system, including: a plurality of electric accumulators connected in series; a plurality of voltage hold devices connected in series; a clock generation circuit for outputting a synchronization signal; and a plurality of the cell balance devices, in which the plurality of the cell balance devices each include a plurality of electric accumulator connection terminals connected to one of a node and two terminals of the plurality of electric accumulators connected in series, and a voltage hold device connection terminal connected to one of a node and two terminals of the plurality of voltage hold devices connected in series.

According to the present invention, when an overcurrent flows through the switch circuit, the overcurrent can be detected and the switch circuit can be turned OFF, to thereby prevent the switch circuit from being broken down.

DETAILED DESCRIPTION OF THE PREFERRED EMBODIMENTS

Figure 1:
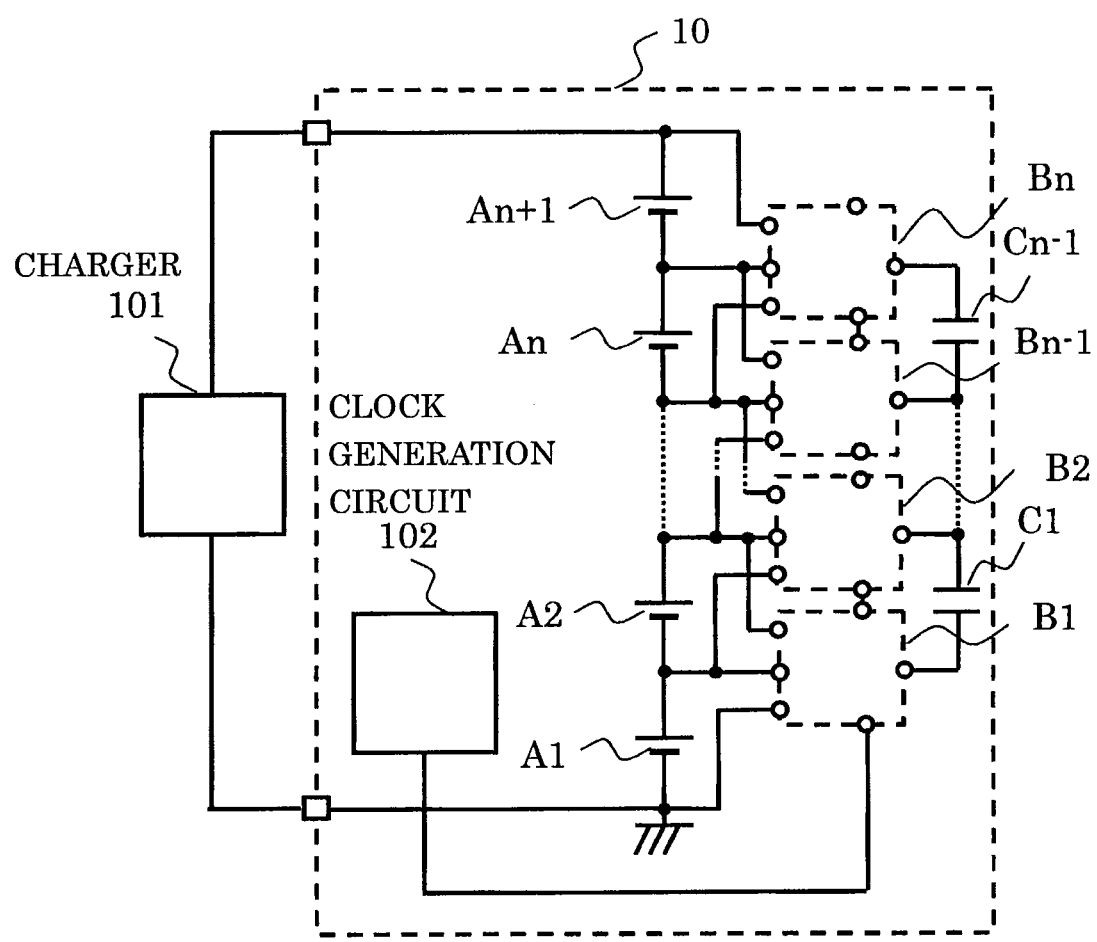
FIG. 1 is a circuit diagram of a battery system including cell balance devices according to an embodiment of the present invention.
Figure 2:
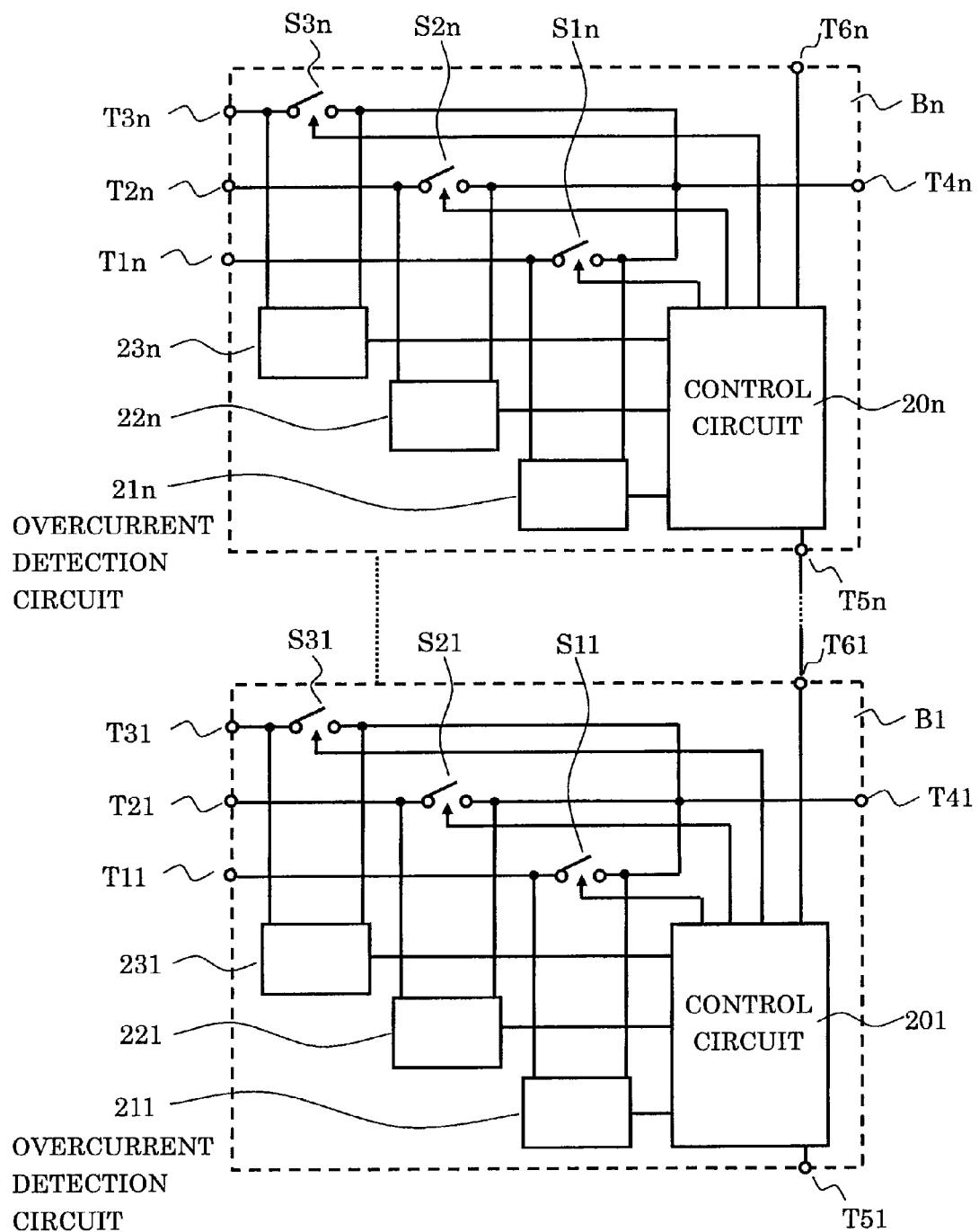
FIG. 2 is a circuit diagram of the cell balance devices according to the embodiment of the present invention.
Figure 4:
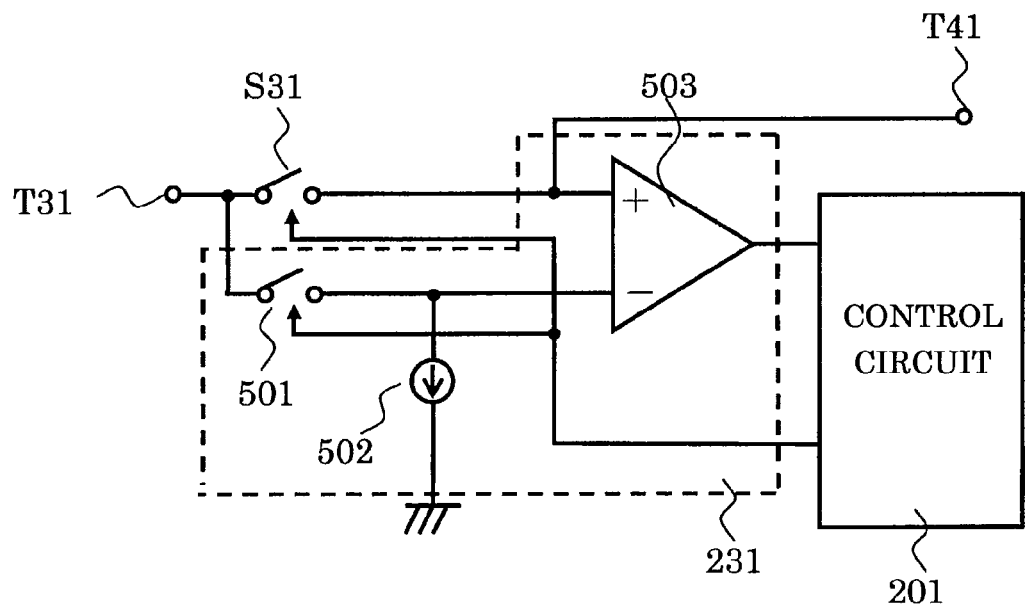
FIG. 4 is a circuit diagram of an overcurrent detecting circuit of the cell balance device according to the embodiment of the present invention.
Figure 5:
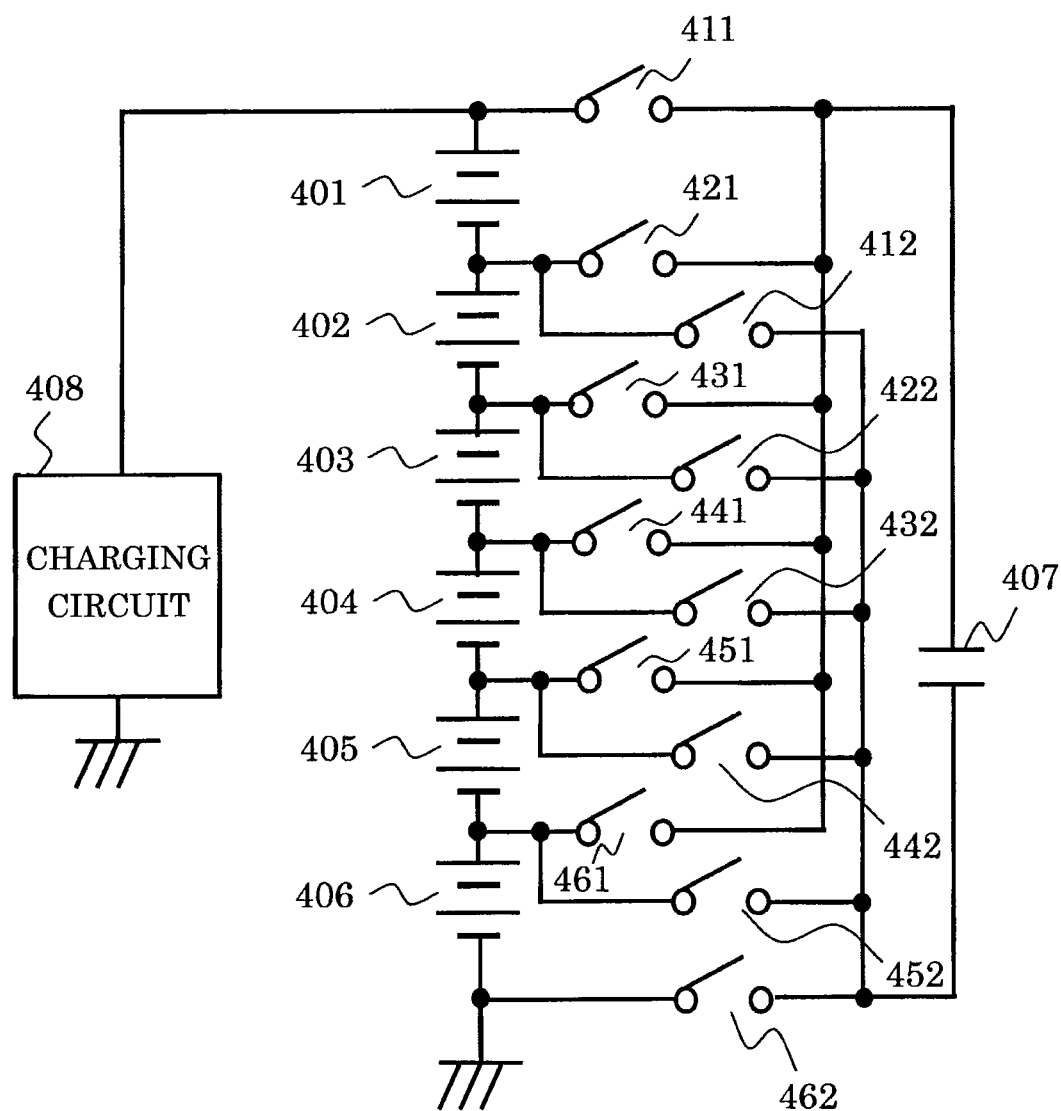
FIG. 5 is a circuit diagram of a cell balance device including a conventional cell balance adjusting circuit.

FIG. 1 is a circuit diagram of a battery system including cell balance devices according to an embodiment of the present invention. FIG. 2 is a circuit diagram of the cell balance devices according to this embodiment. FIG. 4 is a circuit diagram of an overcurrent detecting circuit of the cell balance device according to this embodiment.

A battery system 10 of this embodiment includes a clock generation circuit 102, n+1 secondary batteries A1 to An+1 connected in series, n cell balance devices B1 to Bn, n−1 voltage hold devices (capacitors) C1 to Cn−1, and external terminals to which a charger 101 or a load is to be connected (n is an integer of 2 or more).

The first cell balance device B1 includes switch circuits S11, S21, and S31, a control circuit 201, overcurrent detecting circuits 211, 221, and 231, and terminals T11, T21, T31, T41, T51, and T61. The other cell balance devices B2 to Bn have the same configuration. The overcurrent detection circuit 231 includes a comparator 503, a constant current circuit 502, and a switch circuit 501. The other overcurrent detection circuits have the same configuration.

In the cell balance device B1, the terminal T11 is connected to a negative terminal of the secondary battery A1, the terminal T21 is connected to a positive terminal of the secondary battery A1 and a terminal T12 of the cell balance device B2, the terminal T31 is connected to a positive terminal of the secondary battery A2 and a terminal T22 of the cell balance device B2, the terminal T41 is connected to any one terminal of the voltage hold device C1, the terminal T51 is connected to an output of the clock generation circuit 102, and the terminal T61 is connected to a terminal T52 of the cell balance device B2. In the cell balance device B2, the terminal T22 is connected to a terminal T13 of the cell balance device B3, a terminal T32 is connected to a positive terminal of the secondary battery A3 and a terminal T23 of the cell balance device B3, a terminal T42 is connected to any one terminal of the voltage hold device C2 and the other terminal of the voltage hold device C1, and a terminal T62 is connected to a terminal T53 of the cell balance device B3. The same connection as in the cell balance device B2 is made up to the (n−1)th cell balance device Bn−1. In the cell balance device Bn, a terminal T1n is connected to a negative terminal of the secondary battery An, a terminal T2n is connected to a positive terminal of the secondary battery An and a terminal T3n−1 of the cell balance device Bn−1, a terminal T3n is connected to a positive terminal of the secondary battery An+1, and a terminal T4n is connected to the voltage hold device Cn−1.

In the cell balance device B1, the switch circuit S11 is connected to the terminal T11 and the terminal T41, the switch circuit S21 is connected to the terminal T21 and the terminal T41, and the switch circuit S31 is connected to the terminal T31 and the terminal T41. An input of the overcurrent detection circuit 211 is connected to both terminals of the switch circuit S 11, and an output thereof is connected to the control circuit 201. An input of the overcurrent detection circuit 221 is connected to both terminals of the switch circuit S21, and an output thereof is connected to the control circuit 201. An input of the overcurrent detection circuit 231 is connected to both terminals of the switch circuit S31, and an output thereof is connected to the control circuit 201. The switch circuits S11, S21, and S31 are ON/OFF controlled by signals from the control circuit 201. The other cell balance devices B2 to Bn have the same connection.

In the overcurrent detection circuit 231, the comparator 503 has a non-inverting input terminal connected to the terminal T41, an inverting input terminal connected to any one terminal of the switch circuit 501 and any one terminal of the constant current circuit 502, and an output terminal connected to the constant circuit 201. The other terminal of the switch circuit 501 is connected to the terminal T31. The other terminal of the constant current circuit 502 is connected to the negative terminal of the secondary battery A1. The switch circuits S31 and 501 are controlled to be turned ON/OFF simultaneously in response to an input signal from the control circuit 201. The other overcurrent detection circuits have the same connection.

Figure 3:
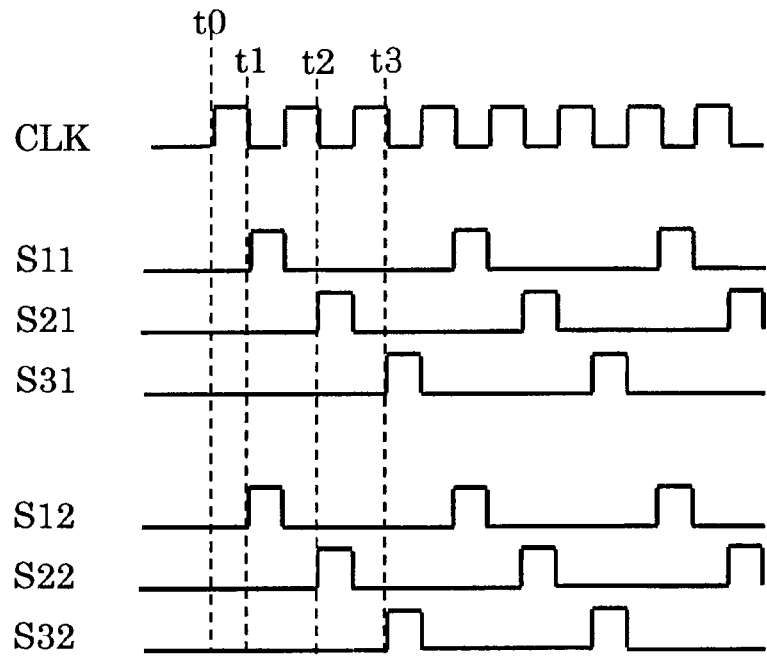
FIG. 3 is a timing chart of signals in the cell balance devices according to the embodiment of the present invention.

Next, an operation of the battery system 10 of this embodiment is described. FIG. 3 is a timing chart of signals in the cell balance devices of this embodiment.

At a time t0, the charger 101 is connected to the external terminals of the battery system 10, and then the clock generation circuit 102 outputs a clock signal CLK. In the cell balance device B1, when the terminal T51 receives the clock signal CLK, the control circuit 201 generates signals for turning ON the switch circuits S11 to S31 in synchronization with the clock signal CLK, and outputs the signals sequentially. The control circuit 201 further outputs the clock signal CLK to the terminal T61. In the next cell balance device B2, the terminal T52 receives the clock signal CLK from the cell balance device B1. The clock signal CLK is transmitted to the cell balance device Bn in this way, and all the cell balance devices B1 to Bn can be synchronized with one another. The switch circuits S11 to S1n, the switch circuits S21 to S2n, and the switch circuits S31 to S3n are therefore respectively controlled to be turned ON sequentially in synchronization with one another.

At a time t1, the switch circuits S11 to S1n are all turned ON and the switch circuits S21 to S2n and the switch circuits S31 to S3n are all turned OFF, and then the secondary batteries A1 to An−1 are connected in parallel to the voltage hold devices C1 to Cn−1, respectively. Then, the secondary batteries A1 to An−1 and the voltage hold devices C1 to Cn−1 perform charging or discharging, respectively.

At a time t2, the switch circuits S21 to S2n are all turned ON and the switch circuits S11 to S1n and the switch circuits S31 to S3n are all turned OFF, and then the secondary batteries A2 to An are connected in parallel to the voltage hold devices C1 to Cn−1, respectively. Then, the secondary batteries A2 to An and the voltage hold devices C1 to Cn−1 perform charging or discharging, respectively.

At a time t3, the switch circuits S31 to S3n are all turned ON and the switch circuits S11 to S1n and the switch circuits S21 to S2n are all turned OFF, and then the secondary batteries A3 to An+1are connected in parallel to the voltage hold devices C1 to Cn−1, respectively. Then, the secondary batteries A3 to An+1 and the voltage hold devices C1 to Cn−1 perform charging or discharging, respectively.

Then, all the cell balance devices B1 to Bn repeat the same operation, with three clocks as one cycle.

Then, if the charger 101 is disconnected from the external terminals of the battery system 10, the clock generation circuit 102 stops outputting the clock signal CLK, thereby finishing the cell balance operation.

By repeating charging/discharging between the secondary batteries A1 to An+1 and the voltage hold devices C1 to Cn−1 in this way, the voltages of the secondary batteries A1 to An+1 can be averaged to reduce voltage fluctuations. With this configuration including the plurality of voltage hold devices corresponding to the number of secondary batteries to be balanced, the cell balance device can be enhanced in balance performance (can be increased in speed for balance).

When the terminal T21 and the terminal T41 are short-circuited under the state in which all the switch circuits S31 to S3n are turned ON, a current flows from the secondary battery A2 via the switch circuit S31. At this time, the switch circuit 501 is also turned ON simultaneously, and a current flows from the constant current circuit 502. Then, a voltage of the inverting input terminal of the comparator 503 is reduced by an ON-state resistance of the switch circuit 501, and the inverting input terminal maintains a constant voltage. When the current continuously flows through the switch circuit S31, and a voltage of the non-inverting input terminal of the comparator 503 falls below the voltage of the inverting input terminal, the comparator 503 outputs a signal of Lo. In response to the signal, the control circuit 201 turns OFF the switch circuit S31. In this way, an overcurrent can be prevented from flowing from the secondary battery A2 via the switch circuit S31, to thereby prevent the switch circuit S31 from being broken down.

An ON-state resistance RonS31 of the switch circuit S31 and an ON-state resistance Ron501 of the switch circuit 501 are set so as to satisfy RonS31/Ron501=N (N is a constant). When an overcurrent detection current is represented by Ioc and the current of the constant current circuit 502 is represented by Iref, the ON-state resistance RonS31 and the ON-state resistance Ron501 are set so as to satisfy Iref=Ioc× RonS31/Ron501. The overcurrent detection current Ioc can be set through adjustment of a current value of the constant current Iref and temperature characteristics thereof and the ON-state resistance of the switch circuit 501 and temperature characteristics thereof. For example, when the ON-state resistance Ron501 is set so that the constant N becomes 0.001, the constant current Iref only needs to be $\frac{1}{1,000}$ of the overcurrent detection current Ioc. Thus, in the case where the switch circuit 501 is formed of a MOS transistor, the switch circuit 501 can be smaller than the switch circuit S31.

When the terminal T11 and the terminal T41 are short-circuited under the state in which all the switch circuits S31 to S3n are turned ON, a current flows from the secondary batteries A1 and A2 via the switch circuit S31. At this time, the switch circuit 501 is also turned ON simultaneously, and a current flows from the constant current circuit 502. Then, a voltage of the inverting input terminal of the comparator 503 is reduced by an ON-state resistance of the switch circuit 501, and the inverting input terminal maintains a constant voltage. When the current continuously flows through the switch circuit S31, and a voltage of the non-inverting input terminal of the comparator 503 falls below the voltage of the inverting input terminal, the comparator 503 outputs a signal of Lo. In response to the signal, the control circuit 201 turns OFF the switch circuit S31. In this way, an overcurrent can be prevented from flowing from the secondary batteries A1 and A2 via the switch circuit S31, to thereby prevent the switch circuit S31 from being broken down. Such overcurrent protection can also be provided to the switch circuits S11 to S1n and S21 to S2n by the same operation. The methods of setting the ON-state resistance of the switch circuit and the current value of the constant current circuit are the same as described above.

When the terminal T21 and the terminal T41 are short-circuited under the state in which all the switch circuits S11 to S1n are turned ON, a current flows from the secondary battery A1 via the switch circuit S11. At this time, a voltage is generated across the switch circuit S11 by its ON-state resistance. The overcurrent detection circuit 211 detects this voltage, and outputs a signal to the control circuit 201 from the output terminal of the overcurrent detection circuit 211. In response to the signal, the control circuit 201 turns OFF the switch circuit S11. In this way, an overcurrent can be prevented from flowing from the secondary battery A1 via the switch circuit S11, to thereby prevent the switch circuit S11 from being broken down.

When the terminal T31 and the terminal T41 are short-circuited under the state in which all the switch circuits S11 to S1n are turned ON, a current flows from the secondary batteries A1 and A2 via the switch circuit S11. At this time, a voltage is generated across the switch circuit S11 by its ON-state resistance. The overcurrent detection circuit 211 detects this voltage, and outputs a signal to the control circuit 201 from the output terminal of the overcurrent detection circuit 211. In response to the signal, the control circuit 201 turns OFF the switch circuit S11. In this way, an overcurrent can be prevented from flowing from the secondary batteries A1 and A2 via the switch circuit S11, to thereby prevent the switch circuit S11 from being broken down. Also in the case where the terminal T41 is short-circuited with another terminal, a current is similarly detected so that the switch circuit S11 can be prevented from being broken down. Further, also in the case where the switch circuits S21 to S2n are turned ON and also in the case of the cell balance devices B2 to Bn, a current that flows when terminals are short-circuited is detected so that the switch circuit can be prevented from being broken down.

Note that, the circuit for detecting a current flowing through the switch circuit is not limited to the above-mentioned configuration.

Further, the cell balance device of this embodiment described above is adapted to achieve a cell balance of the secondary batteries A1 to An+1 connected in series, but the present invention is not limited to the secondary batteries, and the same effect can be obtained as long as the battery is an electric accumulator having the function of accumulating electricity.

As described above, according to the battery system including the cell balance devices of this embodiment, an overcurrent flowing through the switch circuit can be detected and the switch circuit can be turned OFF, to thereby prevent the switch circuit from being broken down.

What is claimed is:

1. A cell balance device for a battery system for adjusting a cell balance of a plurality of electric accumulators connected in series, the cell balance device comprising:
    a plurality of electric accumulator connection terminals each configured to connect to one of a node and two terminals of the plurality of electric accumulators;
    a voltage hold device connection terminal configured to connect to a voltage hold device;
    a plurality of first switch circuits between the plurality of electric accumulator connection terminals and the voltage hold device;
    a receiving terminal for receiving a synchronization signal;
    a transmitting terminal for transmitting the synchronization signal;
    a control circuit for controlling ON/OFF of the plurality of first switch circuits based on the synchronization signal; and
    an overcurrent detection circuit for detecting an overcurrent flowing through each of the plurality of first switch circuits.

2. A cell balance device according to claim 1, wherein the overcurrent detection circuit comprises:
- a second switch circuit which is controlled so as to be turned ON/OFF simultaneously with the each of the plurality of first switch circuits;
- a constant current circuit for allowing a constant current to flow through the second switch circuit; and
- a comparator circuit for comparing a voltage based on an ON-state resistance of the each of the plurality of first switch circuits and a current flowing through the each of the plurality of first switch circuits and a voltage based on an ON-state resistance of the second switch circuit and the constant current.

3. A battery system, comprising:
- a plurality of electric accumulators connected in series;
- a plurality of voltage hold devices connected in series;
- a clock generation circuit for outputting a synchronization signal; and
- a plurality of the cell balance devices,
    - wherein the plurality of the cell balance devices each comprise:
        - a plurality of electric accumulator connection terminals each connected to one of a node and two terminals of the plurality of electric accumulators,
        - a voltage hold device connection terminal connected to one of a node and two terminals of the plurality of voltage hold devices,
        - a plurality of first switch circuits between the plurality of electric accumulator connection terminals and the voltage hold device connection terminal,
        - a receiving terminal for receiving the synchronization signal,
        - a transmitting terminal for transmitting the synchronization signal,
        - a control circuit for controlling ON/OFF of the plurality of first switch circuits based on the synchronization signal, and
        - an overcurrent detection circuit for detecting an overcurrent flowing through each of the plurality of first switch circuits.

4. A battery system, comprising:
- a plurality of electric accumulators connected in series;
- a plurality of voltage hold devices connected in series;
- a clock generation circuit for outputting a synchronization signal; and
- a plurality of the cell balance devices,
    - wherein the plurality of the cell balance devices each comprise:
        - a plurality of electric accumulator connection terminals each connected to one of a node and two terminals of the plurality of electric accumulators,
        - and a voltage hold device connection terminal connected to one of a node and two terminals of the plurality of voltage hold devices,
        - a plurality of first switch circuits between the plurality of electric accumulator connection terminals and the voltage hold device connection terminal,
        - a receiving terminal for receiving the synchronization signal,
        - a transmitting terminal for transmitting the synchronization signal,
        - a control circuit for controlling ON/OFF of the plurality of first switch circuits based on the synchronization signal, and
        - an overcurrent detection circuit for detecting an overcurrent flowing through each of the plurality of first switch circuits,
    - wherein the overcurrent detection circuit comprises:
        - a second switch circuit which is controlled so as to be turned ON/OFF simultaneously with the each of the plurality of first switch circuits;
        - a constant current circuit for allowing a constant current to flow through the second switch circuit; and
        - a comparator circuit for comparing a voltage based on an ON-state resistance of the each of the plurality of first switch circuits and a current flowing through the each of the plurality of first switch circuits and a voltage based on an ON-state resistance of the second switch circuit and the constant current.

\* \* \* \* \*